United States Patent [19]
Kamata et al.

[11] 3,935,526

[45] Jan. 27, 1976

[54] DC-TO-DC CONVERTER

[75] Inventors: Yasuji Kamata; Kazuo Katou, both of Hitachi, Japan

[73] Assignee: Hitachi, Ltd., Japan

[22] Filed: Aug. 14, 1973

[21] Appl. No.: 388,260

[30] Foreign Application Priority Data
Aug. 14, 1972  Japan.............................. 47-80757

[52] U.S. Cl. ...................... 321/2; 321/10; 321/25; 323/89 R
[51] Int. Cl.² ......................................... H02M 3/335
[58] Field of Search ......... 321/2, 44, 10, 25, 45 ER; 323/DIG. 1, 89 R, 89 C

[56]  References Cited
UNITED STATES PATENTS

| | | | |
|---|---|---|---|
| 2,920,259 | 1/1960 | Light............................ | 323/DIG. 1 |
| 3,331,008 | 7/1967 | Bedford........................ | 321/2 |
| 3,629,686 | 12/1971 | Hetterscheid................ | 323/DIG. 1 |
| 3,740,639 | 6/1973 | Easter........................... | 323/DIG. 1 |
| 3,742,371 | 6/1973 | Seibt et al..................... | 321/2 |

*Primary Examiner*—William M. Shoop
*Attorney, Agent, or Firm*—Craig & Antonelli

[57] ABSTRACT

A DC-to-DC converter for providing a DC output voltage proportional to a DC voltage applied to the primary winding of a transformer by turning on and off the applied DC voltage by means of a switching element connected in series with the primary winding. The voltage developed across the secondary winding of the transformer upon the turning on and off of the applied DC voltage is rectified and smoothed by means of a circuit including a rectifying diode, a choke coil and a capacitor. The transformer has a core which exhibits a rectangular hysteresis characteristic. When the switching element is turned off, the current flowing through the choke coil when the switching element is conductive is caused to flow as a reset current through a part of the secondary winding of the transformer so that the level of the magnetic flux of the core of the transformer may be restored to its initial value.

11 Claims, 4 Drawing Figures

DC-TO-DC CONVERTER

BACKGROUND OF THE INVENTION

1. Field of the Invention

This invention relates to a DC-to-DC converter in which a voltage is derived from the secondary winding of a transformer by appropriately switching a DC voltage applied to the primary winding of the transformer and a DC output voltage proportional to the DC voltage applied to the primary winding can be obtained by rectifying and smoothing the derived voltage.

2. Description of the Prior Art

This type of DC-to-DC converter can enjoy stable operation and also serve as an excellent isolator. In such a converter, however, the current through the primary winding of the transformer is unidirectional so that if the core used in the transformer exhibits a rectangular hysteresis characteristic the core is magnetically saturated in one direction. Consequently, the transformer can no longer perform its proper function and the DC-to-DC conversion operation will be impossible. Therefore, some means must be provided to reset the core saturated in the one direction. Moreover, if the switching element used in the converter is turned on and off very rapidly, it sometimes happens that when the switching element is turned off, flyback voltages are generated which may damage the element.

Of the conventional reset means the most common is a reset winding provided on the magnetic core of the transformer, through which DC reset current from a DC source is constantly supplied via a resistor. According to this structure, the flux in the core can be automatically cancelled when the current through the primary winding of the transformer vanishes, i.e. when the switching element is turned off, but the constant reset current flowing through the resistor into the reset winding gives rise to heat loss and therefore the problem of heat dissipation. For this reason the power source section cannot be made small in size. This makes unsuitable the provision of the power source in an electronic computer.

The conventional artifice of preventing damage due to the flyback voltage is to cramp the flyback voltage by a circuit consisting of a diode, a resistor and a capacitor so as to make the amplitude of the flyback voltage equal to that of the voltage of the power source so that the switching element may be prevented from being damaged. In this artifice, too, current flows through the resistor of the cramping circuit to cause heat loss.

SUMMARY OF THE INVENTION

The main object of this invention is to provide a DC-to-DC converter in which heat loss in the power section is small and which has a high efficiency.

The notable features of this invention are as follows. When the current through the primary winding of the transformer vanishes, i.e. when the switching element is turned off, the current then flowing through the smoothing choke coil is caused to flow through a part of the secondary winding of the transformer, so that the level of the magnetic flux of the core of the transformer may be restored to its initial value. Moreover, the flyback voltage generated when the switching element is turned off, is cramped to the level of the source voltage so that the switching element may be prevented from being damaged.

Other objects and features of this invention will be apparent from the following description.

DESCRIPTION OF THE PREFERRED EMBODIMENTS

Figure 1:
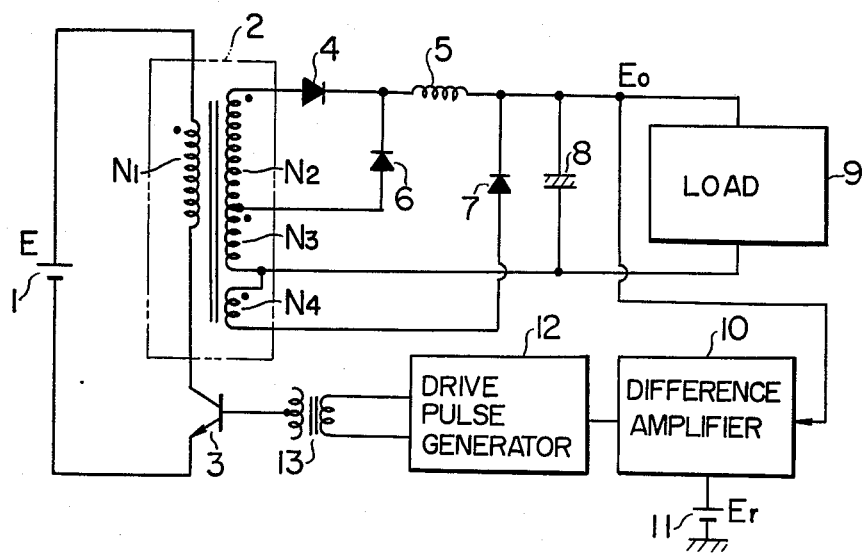
FIG. 1 is a circuit of a DC-to-DC converter according to one embodiment of this invention.

FIG. 1 shows one embodiment of this invention, which comprises a DC source 1, a transformer 2 whose core exhibits a rectangular hysteresis characteristic and which includes a primary winding $N_1$ and a secondary winding consisting of $N_2$, $N_3$ and $N_4$, a switching transistor 3 connected in series with the primary winding $N_1$ and forming a closed circuit with the DC source 1 (E), a rectifying diode 4, a smoothing choke coil 5, a flywheel diode 6, a cramping diode 7, a smoothing capacitor 8, a load 9, a difference amplifier 10 to compare the output voltage $E_0$ with a reference voltage $E_r$ (11) and to obtain an amplified output, a drive pulse generator 12, and an insulating pulse transformer 13. The polarities of the respective windings are as shown in the figure, i.e. as indicated by dot marks. With this circuit arrangement, in an operating range of the transformer 2 where the core is not yet saturated, a DC voltage proportional to the voltage E of the source 1 can be supplied for the load 9 by switching the transistor 3. If a tap to separate the winding $N_3$ from the winding $N_2$ is so provided that the voltage across the winding $N_3$ may be negligible with respect to that across the winding $N_2$, the flywheel diode 6 connected with the tap is not conductive while the transistor 3 is conductive. When the transistor 3 is cut off, the current flowing till then through the choke coil 5 starts circulating through a path consisting of the capacitor 8, the winding $N_3$ and the diode 6. This current through the winding $N_3$ (i.e. through the diode 6) serves to reset the level of the magnetic flux of the transformer core.

Figure 2:
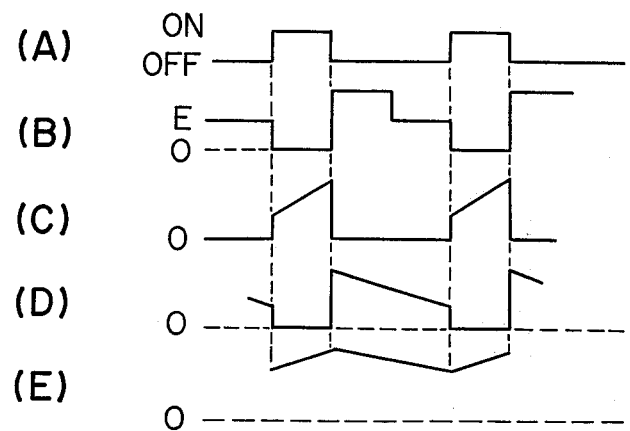
FIG. 2 shows waveforms useful to explain the operation of the circuit shown in FIG. 1.

FIG. 2 shows waveforms appearing at several points in the circuit shown in FIG. 1 during the operation thereof. Waveform (A) corresponds to the conductive and non-conductive states of the transistor 3, waveform (B) to the collector voltage of the transistor 3, waveform (C) to the current through the diode 4, waveform (D) to the current through the diode 6, and waveform (E) to the current through the choke coil 5.

Thus, the level of the magnetic flux of the transformer core is restored to the initial value by diverting the current flowing till then through the choke coil 5 to the circuit of the winding $N_3$ and the diode 6. Namely, in the case where the levels of the saturation magnetic flux for the core are $+\phi_m$ and $-\phi_m$, the level $+\phi_m$ is reset to the level $-\phi_m$. It is therefore unnecessary to supply a constant reset current so that the resultant heat loss can be rendered very small. For example, with a power source of an output of 100 W, the loss in the conventional DC-to-DC converter is about 20 W while the corresponding loss in the DC-to-DC converter according to this invention is several watts.

A flyback voltage is generated by the winding $N_4$ when the transistor 3 is cut off. When the flyback voltage developed across the winding $N_4$ exceeds the output voltage $E_0$, the diode 7 for cramping starts conduction, so that the flyback voltage is cramped to the level of the output voltage $E_0$. In this case, also, there is no heat loss owing to a resistor and a DC-to-DC converter having a high efficiency can be realized.

If the output voltage $E_0$ is varied due to the fluctuation of the load, the duration of the pulse from the drive pulse generator 12 is controlled by the output of the difference amplifier 10. Consequently, the conductive time of the transistor 3 is controlled and the feedback control is performed to stabilize the output voltage $E_0$.

Figure 3:
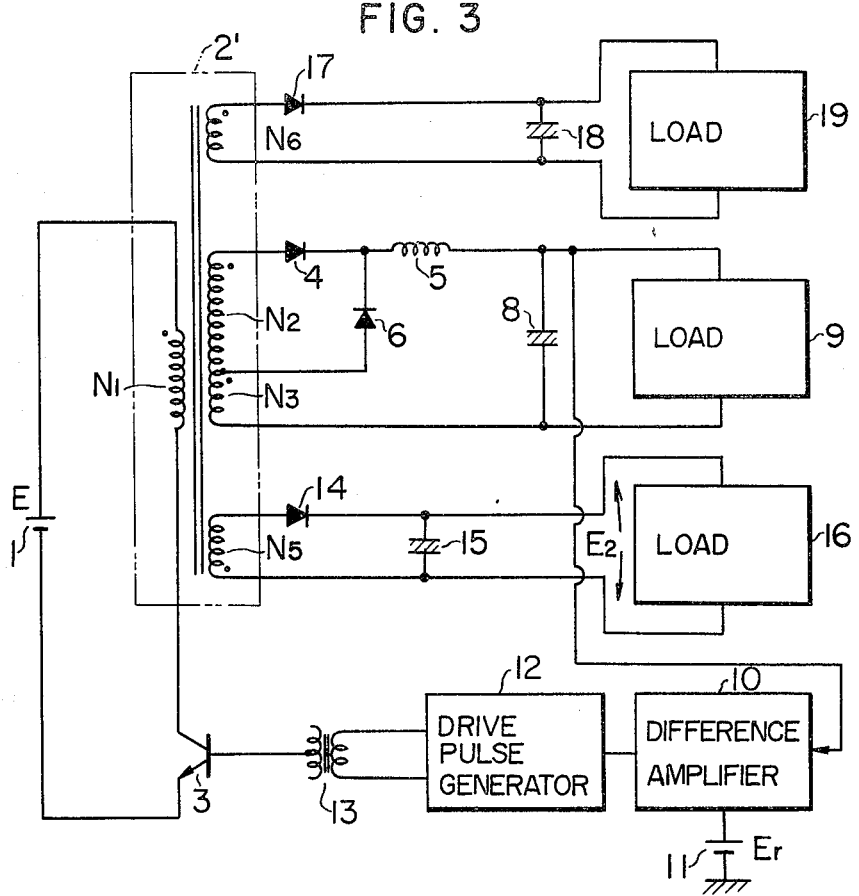
FIGS. 3 and 4 are circuits of converters according to other embodiments of this invention.

FIG. 3 shows another embodiment of this invention, in which a second and a third auxiliary outputs are obtained and the flyback voltage is cramped to the level of the second auxiliary output $E_2$. Output windings $N_5$ and $N_6$ are provided in the transformer 2', the output of the winding $N_5$ being supplied through a diode 14 and a smoothing capacitor 15 for a load 16 and the output of the winding $N_6$ being fed through a diode 17 and a capacitor 18 to a load 19. The polarity of the winding $N_5$ is opposite to those of the windings $N_2$, $N_3$ and $N_6$ so that the flyback voltage generated when the transistor 3 is cut off is applied through the diode 14 to the smoothing capacitor 15. In this case, the output voltage of the winding $N_5$, i.e. flyback voltage, is cramped so as to have a level equal to that of the voltage $E_2$.

Figure 4:
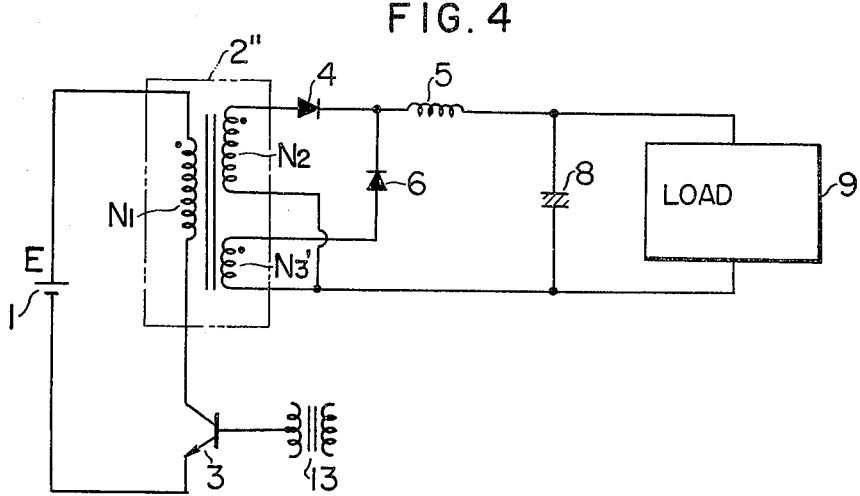

FIG. 4 shows a third embodiment of this invention, in which the means for resetting the level of the magnetic flux of the transformer core is modified. In this embodiment, the transformer 2'' has a primary winding $N_1$ and a secondary winding consisting of $N_2$ and $N'_3$ and the like ends (having the same polarity) of the windings $N_2$ and $N'_3$ are connected respectively through the diodes 4 and 6 with one end of the choke coil 5 while the other like ends of the windings $N_2$ and $N'_3$ are commonly connected via the smoothing capacitor 8 with the other end of the choke coil 5. The capacitor 8 is shunted by the load 9 through which DC power is consumed. The number of turns of the winding $N'_3$ is smaller than that of the winding $N_2$. In this case, also, simultaneously with the cut-off of the transistor 3, the current flowing till then through the choke coil 5 is in turn caused to flow through the diode 6 and the winding $N'_3$ to restore the level of the magnetic flux of the transformer core to the initial value. In FIG. 4, only the parts constituting the resetting means are shown, with the other parts omitted.

As described above, according to this invention, when the switching transistor is cut off, the current flowing till then through the choke coil is in turn caused to flow through a part of the secondary winding of the transformer, so that the level of the magnetic flux of the transformer core may be restored to its initial value. Further, the flyback voltage generated when the switching transistor is turned off, is cramped to the level of the output voltage so that heat loss is small and the overall device, i.e. a DC-to-DC converter, having a smaller size can be realized. Namely, a reduction in size and cost of more than 20 percent can be expected according to this invention, as compared with the conventional DC-to-DC converter.

We claim:

1. A DC-to-DC converter to provide a DC output voltage proportional to the DC voltage applied to the primary winding of a transformer by turning on and off said DC voltage by means of a switching element connected in series with said primary winding, and rectifying and smoothing the voltage developed across the secondary winding of said transformer upon the turning on and off of said DC voltage by means of a circuit including a rectifying diode, a choke coil and a capacitor, said transformer having a core exhibiting a rectangular hysteresis characteristic, wherein said converter includes reset means for causing, at the time of turning off of said switching element, the current flowing through said choke coil at the time of turning on of said switching element to flow as a reset current through a part of said secondary winding of said transformer so that the level of the magnetic flux of said core of said transformer may be restored to its initial value.

2. A DC-to-DC converter as claimed in claim 1, wherein said secondary winding has a tap, one end of said secondary winding is connected through said rectifying diode to one end of said choke coil, and said reset means comprises a flywheel diode connected between said tap and said one end of said choke coil, said reset current flowing through the part of said secondary winding between the other end of said secondary winding and said tap.

3. A DC-to-DC converter as claimed in claim 1, wherein said secondary winding comprises two windings having different numbers of turns, said reset means comprises a flywheel diode connected to the one of said two windings having the smaller number of turns, and the ends of said two windings having the same polarity are connected respectively through said rectifying diode and said flywheel diode to one end of said choke coil while the other ends of said two windings are connected with each other, said reset current flowing through said one winding.

4. A DC-to-DC converter as claimed in claim 1, wherein said transformer is further provided with another secondary winding and the voltage generated across said another secondary winding when said switching element is turned off is applied through a diode to a smoothing capacitor, the flyback voltage generated upon the turning off of said switching element being cramped to the level of said DC output voltage.

5. A DC-to-DC converter as claimed in claim 1, wherein said transformer is provided with a plurality of separate secondary windings whose output voltages are supplied respectively through diodes and smoothing capacitors to separate loads and one of said plurality of secondary windings is arranged in inverse polarity with the other secondary windings.

6. A DC-to-DC converter comprising a DC power source, a transformer having a core exhibiting a rectangular hysteresis characteristic and having first, second and third windings, a switching transistor connected through said first winding to said DC power source to form a closed circuit together therewith, a smoothing choke coil, diodes connected respectively between the ends of said second and third windings having the same polarity and one end of said choke coil, a smoothing capacitor connected between the other end of said third winding and the other end of said choke coil, and reset means for causing, at the time of turning off of said switching transistor, the current flowing through said choke coil at the time of turning on of said transistor to flow as a reset current through one of said diodes connected to said third winding into said third winding so that the level of the magnetic flux of said core of said transformer may be restored to its initial value.

7. A DC-to-DC converter as claimed in claim 6, wherein said transformer is further provided with a fourth winding and the voltage developed across said fourth winding when said transistor is turned off is applied through a diode to a smoothing capacitor, the flyback voltage generated upon the turning off of said switching transistor being cramped to the level of an output voltage.

8. A DC-to-DC converter as claimed in claim 7, further comprising means for detecting the deviation of the output voltage from a reference voltage and controlling the conductive period of said transistor in accordance with the detected output, said output voltage being stabilized.

9. A DC-to-DC converter for providing a DC output voltage proportional to an applied DC voltage, said converter comprising:
    a transformer having a core exhibiting a rectangular hysteresis characteristic,
    switching means for enabling said applied DC voltage to be supplied to the primary winding of said transformer when said switching means is conductive,
    a choke coil connected in circuit with the secondary winding of said transformer, and
    reset means for causing current flowing through said choke coil when said switching means in conductive to flow as a reset current through a part of said secondary winding of said transformer when said switching means is not conductive so that the level of the magnetic flux of said core of said transformer may be restored to its initial value.

10. A DC-to-DC converter as defined in claim 9, wherein said secondary winding has a tap, one end of said secondary winding is connected through a rectifying diode to one end of said choke coil, and said reset means comprises a flywheel diode connected between said tap and said one end of said choke coil, said reset current flowing through the part of said secondary winding between the other end of said secondary winding and said tap.

11. A DC-to-DC converter as claimed in claim 9, wherein said secondary winding comprises two windings having different numbers of turns, said reset means comprises a flywheel diode connected to one of said two windings having the smaller number of turns, and the ends of said two windings having the same polarity are connected respectively through a rectifying diode and said flywheel diode to one end of said choke coil while the other ends of said two windings are connected with each other, said reset current flowing through said one winding.

* * * * *